United States Patent
Choi (10) Patent No.: US 11,713,092 B2
(45) Date of Patent: Aug. 1, 2023

(54) DROP-OUT MOUNTING STRUCTURE OF BICYCLE FRAME

(71) Applicants: Hyundai Motor Company, Seoul (KR); KIA Motors Corporation, Seoul (KR)

(72) Inventor: Jungnam Choi, Seongnam-si (KR)

(73) Assignees: Hyundai Motor Company, Seoul (KR); KIA Motors Corporation, Seoul (KR)

(*) Notice: Subject to any disclaimer, the term of this patent is extended or adjusted under 35 U.S.C. 154(b) by 1274 days.

(21) Appl. No.: 16/210,273

(22) Filed: Dec. 5, 2018

(65) Prior Publication Data

US 2019/0389530 A1  Dec. 26, 2019

(30) Foreign Application Priority Data

Jun. 25, 2018  (KR) .......................... 10-2018-0072539

(51) Int. Cl.
| | |
|---|---|
| *B62K 25/02* | (2006.01) |
| *B21D 53/86* | (2006.01) |
| *B62K 19/20* | (2006.01) |
| *B62K 19/30* | (2006.01) |

(52) U.S. Cl.
CPC .............. *B62K 25/02* (2013.01); *B21D 53/86* (2013.01); *B62K 19/20* (2013.01); *B62K 19/30* (2013.01)

(58) Field of Classification Search
CPC ........ B62K 25/02; B62K 19/20; B62K 19/30; B21D 53/86
See application file for complete search history.

(56) References Cited

U.S. PATENT DOCUMENTS

| | | | | |
|---|---|---|---|---|
| 4,805,941 A | * | 2/1989 | Downing ............... | B62K 25/02 301/113 |
| 4,856,802 A | * | 8/1989 | Schilplin ................ | B62K 25/02 474/116 |
| 5,025,977 A | * | 6/1991 | Hartman ................ | B62K 25/02 228/171 |

(Continued)

FOREIGN PATENT DOCUMENTS

| | | |
|---|---|---|
| CN | 2360325 Y | 1/2000 |
| CN | 107187534 A | 9/2017 |

(Continued)

OTHER PUBLICATIONS

Patent Technology Display Stand, Electric Bicycle. 2011, (No. 5), pp. 34-35 & English translation.

*Primary Examiner* — Kevin Hurley
*Assistant Examiner* — Harold Eric Pahlck, III
(74) *Attorney, Agent, or Firm* — Lempia Summerfield Katz LLC (57) ABSTRACT

A drop-out mounting structure of a bicycle frame to inhibit a drop-out member from being separated from the bicycle frame is disclosed. The drop-out mounting structure of the bicycle frame for mounting a drop-out member as a wheel mounting unit to a drop-out mounting unit of a bicycle frame through a bolt may include an assembly slot formed at the drop-out mounting unit to insert the drop-out member inside the drop-out mounting unit and a stopper unit formed at an upper end part of the drop-out member with a length that is longer than an opening end of the assembly slot.

11 Claims, 8 Drawing Sheets

(56) References Cited

U.S. PATENT DOCUMENTS

| | | | | |
|---|---|---|---|---|
| 5,058,913 A * | 10/1991 | La Riviere | | B62K 25/02 280/281.1 |
| 5,082,303 A * | 1/1992 | Duehring | | B62K 25/02 280/288 |
| 5,096,215 A * | 3/1992 | Chonan | | B62K 25/02 280/281.1 |
| 7,044,874 B2 * | 5/2006 | Shahana | | B62M 9/125 474/82 |
| 8,087,686 B1 * | 1/2012 | Carroll | | B62K 19/30 280/281.1 |
| 9,168,967 B2 | 10/2015 | Choi | | |
| 9,545,971 B2 * | 1/2017 | Beutner | | B62K 19/16 |
| 10,569,825 B2 * | 2/2020 | Choi | | B62K 25/28 |
| 2005/0151346 A1 * | 7/2005 | James | | B62K 25/02 280/288 |
| 2009/0236819 A1 * | 9/2009 | Scurlock | | B62K 19/30 280/281.1 |
| 2011/0042917 A1 * | 2/2011 | Cleveland | | B62K 25/02 280/285 |
| 2011/0316249 A1 * | 12/2011 | Thoma | | B62K 25/02 280/279 |
| 2011/0316250 A1 * | 12/2011 | Lumpkin | | B62K 19/30 280/285 |
| 2011/0316251 A1 * | 12/2011 | Lumpkin | | B62K 19/30 280/285 |
| 2012/0274042 A1 * | 11/2012 | Harris | | B62K 19/30 280/288 |
| 2014/0049020 A1 * | 2/2014 | Wendt | | B62K 25/02 280/274 |
| 2014/0054873 A1 * | 2/2014 | Cocalis | | B62K 25/02 280/281.1 |
| 2014/0306422 A1 * | 10/2014 | Scolari | | B62K 15/00 280/259 |
| 2015/0048592 A1 * | 2/2015 | Choi | | B21D 53/86 280/288.3 |
| 2015/0145231 A1 * | 5/2015 | McDonald | | B62K 25/02 280/287 |
| 2015/0203167 A1 * | 7/2015 | Saiki | | B62K 25/02 180/21 |
| 2015/0266537 A1 * | 9/2015 | Lee | | B62K 27/12 280/292 |
| 2016/0001845 A1 * | 1/2016 | Becker | | B62K 25/02 301/125 |
| 2016/0039494 A1 * | 2/2016 | Mikesell | | B62K 3/02 474/82 |
| 2016/0207583 A1 * | 7/2016 | Conway | | B62K 3/002 |
| 2016/0214678 A1 * | 7/2016 | Schlanger | | B62K 25/02 |
| 2016/0271680 A1 * | 9/2016 | Chen | | B62K 25/02 |
| 2017/0129569 A1 * | 5/2017 | Mangum | | B62K 13/08 |
| 2017/0267308 A1 * | 9/2017 | Geissler | | B62K 25/02 |
| 2018/0050758 A1 * | 2/2018 | Pfeiffer | | B62K 3/10 |
| 2018/0065704 A1 * | 3/2018 | Choi | | B62K 19/34 |
| 2018/0111656 A1 * | 4/2018 | Choi | | B62K 3/02 |
| 2018/0154976 A1 * | 6/2018 | Choi | | B62K 25/04 |
| 2019/0376778 A1 * | 12/2019 | Choi | | G01B 5/25 |
| 2020/0198728 A1 * | 6/2020 | Braedt | | B62M 9/125 |
| 2020/0298933 A1 * | 9/2020 | Braedt | | B62M 9/1242 |
| 2022/0089245 A1 * | 3/2022 | Li | | B62K 21/02 |

FOREIGN PATENT DOCUMENTS

| | | |
|---|---|---|
| CN | 206485495 U | 9/2017 |
| CN | 206704404 U | 12/2017 |
| CN | 207029456 U | 2/2018 |
| DE | 10200568 A1 | 7/2003 |
| GB | 2501642 A | 10/2013 |
| KR | 20-2012-003624 U | 5/2012 |
| KR | 20150019938 A | 2/2015 |
| KR | 10-2016-0074267 A | 6/2016 |
| WO | 2012145831 A1 | 11/2012 |

* cited by examiner

DROP-OUT MOUNTING STRUCTURE OF BICYCLE FRAME

CROSS-REFERENCE TO RELATED APPLICATION

This application claims priority to and the benefit of Korean Patent Application No. 10-2018-0072539, filed on Jun. 25, 2018, which is incorporated herein by reference in its entirety.

FIELD

The present disclosure relates to a frame structure for mounting a wheel in a bicycle.

BACKGROUND

The statements in this section merely provide background information related to the present disclosure and may not constitute prior art.

In general, a bicycle frame includes a head tube, a seat tube, a top tube, a down tube, a seat stay, and a chain stay.

A steering wheel connection body is connected to an upper end portion of the head tube, and a front wheel rotary connection body is connected to a lower end portion of the head tube. A saddle connection body is connected to an upper end portion of a seat tube, and a chain drive body is connected to a lower end portion of the seat tube.

The top tube and the down tube connect and support the head tube and the seat tube, and the seat stay and the chain stay connect and support a rear wheel rotary connection body and the seat tube. The bicycle frame may include both the top tube and the down tube, but alternatively, one main tube (not shown) may be connected between the head tube and the seat tube.

The typical bicycle frame is manufactured by respectively cutting a top tube, a down tube, and a seat tube using a tube as a base material and then respectively welding them, but since it is difficult to automatically perform such manufacturing processes, productivity may deteriorate and manufacturing cost may increase.

Therefore, research for improving production efficiency and durability of the bicycle frame through a process of manufacturing a bicycle frame by stamp-molding a plate member and then bonding left and right portions of the hot-stamped plate member has recently developed.

On the other hand, in the above-described bicycle frame, a rear wheel is mounted on a part where the left and right seat stays and the left and right chain stays meet and a drop-out assembly for aligning the wheel alignment is coupled. For example, the drop-out assembly is fastened to the part where the left and right seat stays and the left and right chain stays meet by a bolt in the stamped frame structure.

However, in a conventional art, since the drop-out assembly is fastened to the frame by the bolt, we have discovered that the drop-out assembly may be released from the frame by an impact, or a vibration, etc. acted on the frame. In such a case, a user on the bicycle may be injured because the drop-out assembly can be separated from the frame along with the rear wheel.

The above information disclosed in this Background section is only for enhancement of understanding of the background of the present disclosure, and therefore it may contain information that does not form the prior art that is already known to a person of ordinary skill in the art.

SUMMARY

The present disclosure provides a drop-out mounting structure of the bicycle frame to inhibit or prevent the drop-out assembly from being separated from the frame due to the loosening of the bolt.

A drop-out mounting structure for mounting a drop-out member as a wheel mounting unit to a drop-out mounting unit of a bicycle frame with a bolt according to an exemplary form of the present disclosure includes an assembly slot formed at the drop-out mounting unit to insert the drop-out member inside the drop-out mounting unit, and a stopper unit formed at an upper end part of the drop-out member with a length that is longer than an opening end of the assembly slot.

According to the exemplary form of the present disclosure, the stopper unit may support an inner upper end of the drop-out mounting unit and both side edge parts in a front and rear direction of the opening end of the assembly slot.

According to the exemplary form of the present disclosure, a portion of the drop-out mounting unit forming the stopper unit may be disposed inside the drop-out mounting unit, and the rest of the drop-out member may form an axle insertion groove and may be disposed outside the drop-out mounting unit.

According to the exemplary form of the present disclosure, the drop-out member may be mounted to a stay frame of the bicycle frame in which both side panels that are respectively stamp-molded are bonded by welding.

According to the exemplary form of the present disclosure, a plurality of bolt coupling holes may be formed at one side panel of the stay frame, and a plurality of bolt fastening holes coinciding with the bolt coupling holes may be formed at the drop-out member.

According to a further aspect of the present disclosure, the assembly slot may be formed at the lower end of the drop-out mounting unit in the front and rear direction, and the stopper unit may be formed at the upper end part of the drop-out member in the front and rear direction. In addition, the drop-out member may be inserted inside the drop-out mounting unit through the assembly slot by turning the drop-out member in a direction, support the inner upper end of the drop-out mounting unit through the stopper unit, and be fastened to the drop-out mounting unit by the bolt in a fixedly disposed state.

According to the exemplary form of the present disclosure, the stopper unit may include a first stopper protrusion formed to be protruded from the upper end part of the drop-out member to the rear side, and a second stopper protrusion formed to be protruded from the upper end part of the drop-out member to the front side with a protrusion length that is larger than the first stopper protrusion.

According to the exemplary form of the present disclosure, the first stopper protrusion may be in surface contact with the rear upper part rounded in the up and down direction of the drop-out mounting unit.

According to the exemplary form of the present disclosure, a guide groove may be formed along an insertion path of the drop-out member at the drop-out mounting unit, and a guide protrusion coupled to slide in the guide groove may be formed at the drop-out member.

According to the exemplary form of the present disclosure, a guide protrusion coupled to slide in the guide groove may be formed at the second stopper protrusion.

According to the exemplary form of the present disclosure, the guide groove may extend in the upper direction at the opening end of the assembly slot and may form a guide path that is bent in the front side.

A drop-out mounting structure for mounting a drop-out member as a wheel mounting unit to a drop-out mounting unit of a bicycle frame in which two side panels that are respectively stamp-molded are bonded by welding with a bolt according to an exemplary form of the present disclosure includes upper and lower assembly slots respectively formed in the front and rear direction at the upper end and the lower end of the drop-out mounting unit to insert the drop-out member inside the drop-out mounting unit, and a stopper unit formed in the front and rear direction at the upper end part of the drop-out member with a length that is longer than the opening end of the upper and lower assembly slots. In addition, the drop-out member may be inserted to the lower assembly slot through the upper assembly slot by turning the drop-out member in a direction, may be turned in other direction while being moved in the rear side, may support the inner upper end of the drop-out mounting unit through the stopper unit, and may be fastened to the drop-out mounting unit by the bolt.

According to the exemplary form of the present disclosure, front and rear ends of the stopper unit may support both side edge parts in the front and rear direction of the upper assembly slot inside the drop-out mounting unit.

According to an exemplary form of the present disclosure, the stopper unit may include: a first stopper protrusion formed to be protruded from the upper end part of the drop-out member to the rear side; and a second stopper protrusion formed to be protruded from the upper end part of the drop-out member to the front side with a protrusion length that is larger than the first stopper protrusion.

According to an exemplary form of the present disclosure, inside the drop-out mounting unit, the first stopper protrusion may support the rear side edge part of the upper assembly slot, and the second stopper protrusion may support the front side edge part of the upper assembly slot.

According to an exemplary form of the present disclosure, the first stopper protrusion may be in surface contact with the rear upper part that is rounded in the up and down direction of the drop-out mounting unit.

A drop-out mounting structure for mounting a drop-out member as a wheel mounting unit to a drop-out mounting unit of a bicycle frame in which both side panels that are respectively stamp-molded are bonded by welding with a bolt according to an exemplary form of the present disclosure includes an assembly slot formed to be connected to the rear end and the lower end of the drop-out mounting unit to insert the drop-out member inside the drop-out mounting unit, and a stopper unit formed at the upper end part of the drop-out member with a width that is larger than the width of the assembly slot in the front and rear direction. In addition, the drop-out member may be inserted inside the drop-out mounting unit through the assembly slot by turning the drop-out member in a direction, may support the inner upper end of the drop-out mounting unit through the stopper unit, and may be fastened to the drop-out mounting unit by the bolt in a fixedly disposed state.

According to the exemplary form of the present disclosure, the stopper unit may include a first stopper protrusion formed to be protruded to a rear side and rounded along the lower direction at the upper end part of the drop-out member, and a second stopper protrusion formed to be protruded to the front side from the upper end part side of the drop-out member.

According to an exemplary form of the present disclosure, inside the drop-out mounting unit, the first stopper protrusion may be in surface contact with the rear upper part that is rounded in an up and down direction of the drop-out mounting unit.

In the exemplary forms of the present disclosure, since the drop-out member forming the stopper unit is inserted inside the drop-out mounting unit and the drop-out member is mounted at the drop-out mounting unit by the bolt, even if the bolt is released by an external force, the drop-out member may be inhibited or prevented from being separated from the drop-out mounting unit by the stopper unit.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Further, the sizes and thicknesses of the configurations shown in the drawings are selectively provided for convenience of description, so the present disclosure is not limited to those shown in the drawings, and the thicknesses are exaggerated to make some parts and regions clear.

Discriminating the names of components as first, second, etc. in the following description is for discriminating them for the same relationship of the components, and the components are not limited to the order in the following description.

Throughout the specification, unless explicitly described to the contrary, the word "comprise" and variations such as "comprises" or "comprising" will be understood to imply the inclusion of stated elements but not the exclusion of any other elements.

Further, the terms, " . . . unit", " . . . mechanism", " . . . portion", " . . . member" etc. used herein mean the unit of inclusive components performing at least one or more functions or operations.

Figure 1:
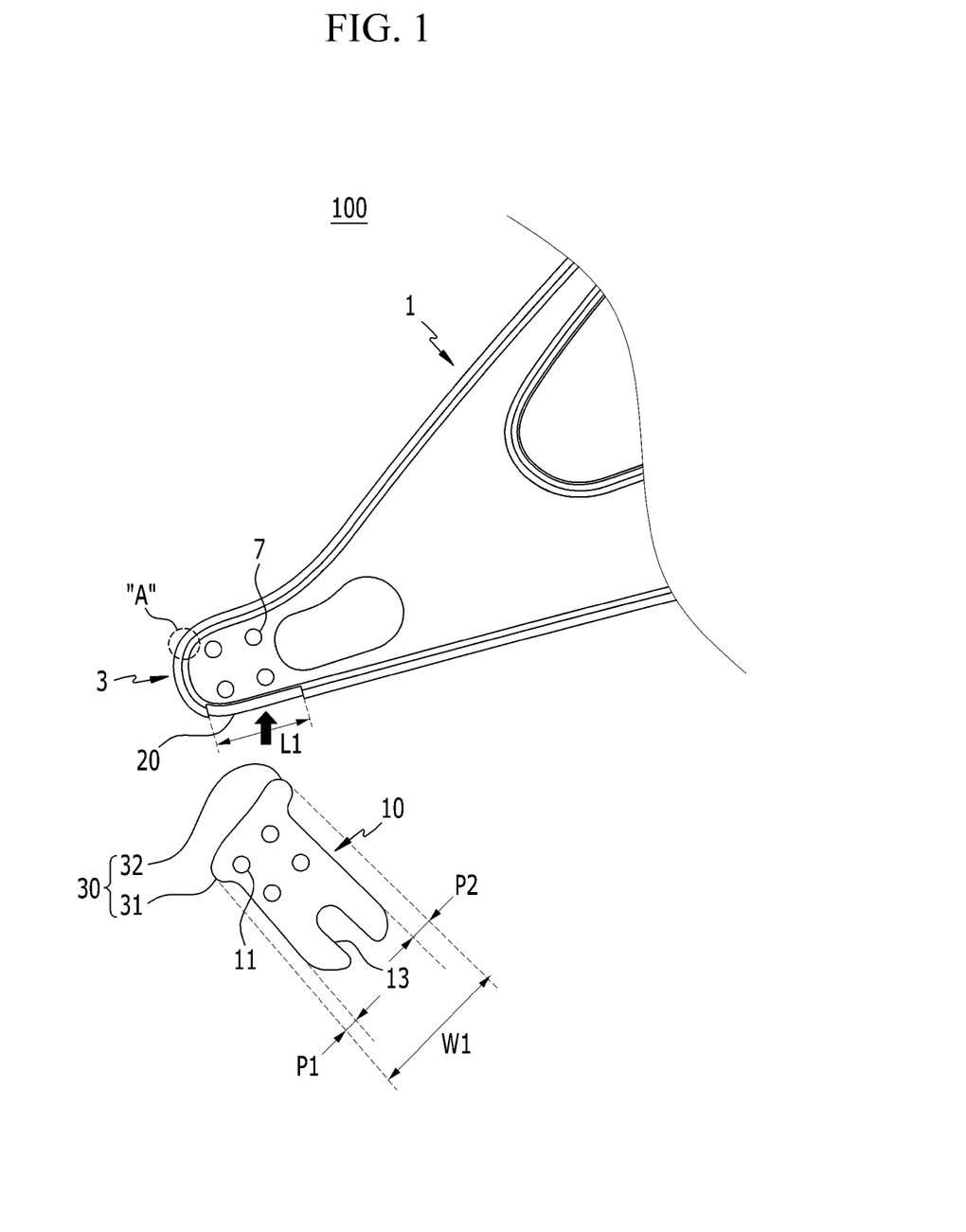
FIG. 1 is an exploded perspective view showing a drop-out mounting structure of a bicycle frame according to a first exemplary form of the present disclosure.
Figure 2:
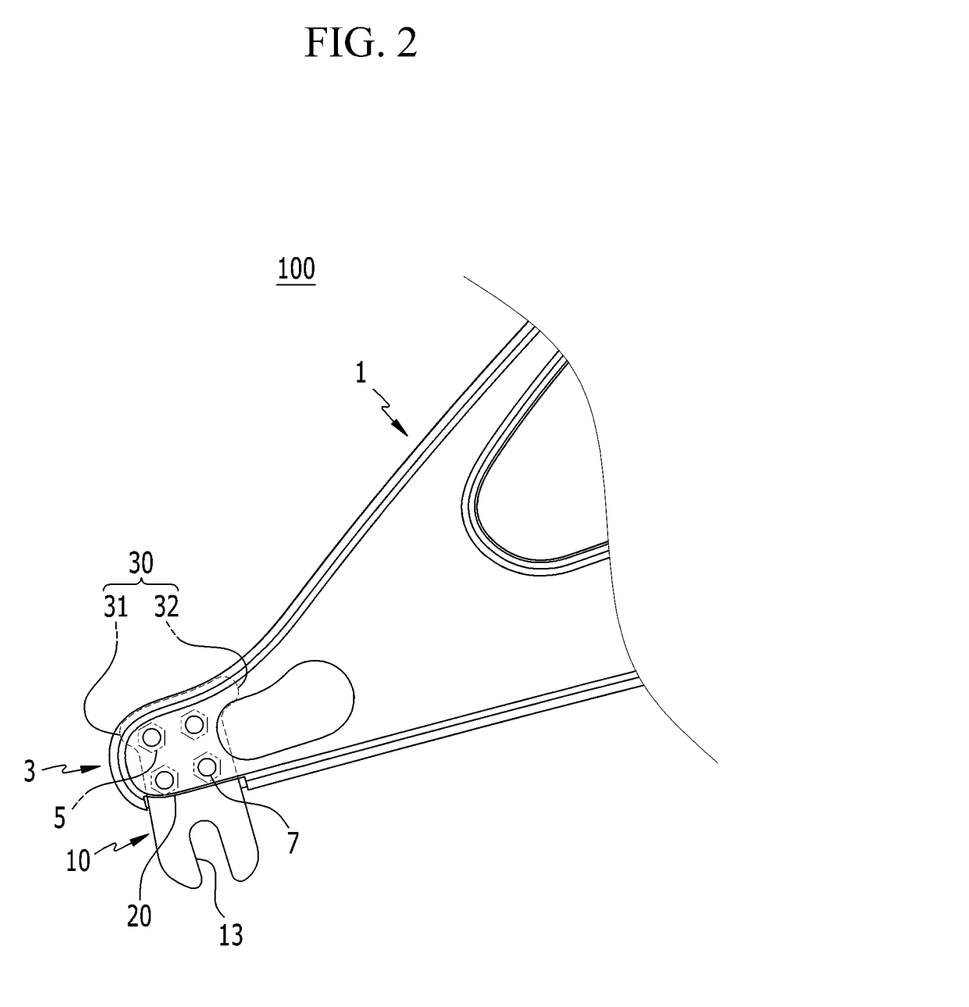
FIG. 2 is a coupled side schematic diagram showing the drop-out mounting structure of the bicycle frame according to the first exemplary form of the present disclosure.

FIG. 1 is an exploded perspective view showing a drop-out mounting structure of a bicycle frame according to a first exemplary form of the present disclosure, and FIG. 2 is a coupled side schematic diagram showing the drop-out mounting structure of the bicycle frame according to the first exemplary form of the present disclosure.

Referring to FIG. 1 and FIG. 2, a drop-out mounting structure 100 according to an exemplary form of the present disclosure may be installed to a bicycle frame. Furthermore, the drop-out mounting structure 100 according to an exemplary form of the present disclosure may be installed to a bicycle frame made in a shape having a closed section by welding left and right side panels that are respectively stamp-molded in a predetermined shape.

For example, the above-described bicycle frame may be configured of a head tube, a seat tube, a top tube, a down tube, and a stay frame 1. The bicycle frame having such a configuration may be a stamped frame of a tube shape in which left and right panels are respectively stamp-molded in a predetermined shape and the stamp-molded left and right panels are assembled.

However, the scope of the present disclosure is not limited to a bicycle frame manufactured by assembling both side panels stamp-molded in the predetermined shape, and a technical scope of the present disclosure is also applicable to a bicycle frame manufactured by welding separated cut tubes.

On the other hand, in the above-described bicycle frame, the stay frame 1 is a frame in which the seat stay and the chain stay are connected to right and left sides, and a drop-out member 10 is mounted as a wheel mounting unit. The drop-out member 10 may be fastened to a drop-out mounting unit 3 of the stay frame 1 by a bolt 5 for mounting a rear wheel rotary connection body to the stay frame 1 and performing wheel alignment of the rear wheel.

The stay frame 1 may include various other accessory components such as a bracket, a collar, a rib, a block, etc. for mounting various parts. However, since the various accessory components are used to mount the various parts to the stay frame 1, they are collectively referred to as the bicycle frame except for an exceptional case in an exemplary form of the present disclosure.

In the following description, the left side in the drawing is defined as a rearward, the right side is defined as a forward, and the front and rear direction means a front and rear length direction of the bicycle frame. Further, in the following, an upward part is defined as an upper end part, an upper part, an upper end, and an upper surface, and a downward part is defined as a lower end part, a lower part, a lower end, and a lower surface.

Furthermore, "an end (one end or the other end)" in the following may be defined as a side end or a predetermined part (one end part or the other end part) including the side end.

The drop-out member 10 according to an exemplary form of the present disclosure may be respectively mounted at the left and right stay frame 1, and may be mounted at any one stay frame 1.

In an exemplary form of the present disclosure, the drop-out mounting structure 100 of the bicycle frame is made for inhibiting or preventing the drop-out member 10 from being detached from the stay frame 1 by loosening the bolt 5.

The drop-out mounting structure 100 of the bicycle frame according to an exemplary form of the present disclosure includes an assembly slot 20 formed at the drop-out mounting unit 3 of the stay frame 1, and a stopper unit 30 formed at the drop-out member 10.

Before describing the assembly slot 20 and the stopper unit 30, the stay frame 1 is provided with a shape having a closed section (an inner space) by welding left and right panels respectively stamp-molded in a predetermined shape as described above. In the drop-out mounting unit 3 of the stay frame 1, one side panel includes a plurality of bolt coupling holes 7.

The drop-out member 10 is provided to be inserted into the inner space of the stay frame 1, and the drop-out member 10 includes a plurality of bolt fastening holes 11 connected to the bolt coupling holes 7 of the drop-out mounting unit 3.

According to an exemplary form of the present disclosure, the assembly slot 20 is used to insert the drop-out member 10 to the inside of the drop-out mounting unit 3, and is formed at the lower end of the drop-out mounting unit 3 in the front and rear direction.

The assembly slot 20 forms an open end that is opened toward the lower side with a predetermined length L1. As shown in FIGS. 1 and 2, the drop-out member 10 may be inserted to the inside of the drop-out mounting unit 3 through the open end of the assembly slot 20.

In the drop-out member 10, the part (the upper part) including the upper end part is disposed inside the drop-out mounting unit 3. The rest (the lower part) of the drop-out member 10 forms an axle insertion groove 13, and is disposed at the outside of the drop-out mounting unit 3. The axle insertion groove 13 is a part to which an axle of a rear wheel hub is inserted and is opened downward, and has a structure that is inclined forwardly at a predetermined angle.

According to an exemplary form of the present disclosure, the stopper unit 30 is used to inhibit the drop-out member 10 from being separated from the stay frame 1 due to the loosening of the bolt 5. The stopper unit 30 is formed in the front and rear direction at the upper end part of the drop-out member 10.

The stopper unit 30 is formed along the front and rear direction with a length W1 that is longer than the length L1 of the opening end of the assembly slot 20. The stopper unit 30 supports the inner upper end of the drop-out mounting unit 3 by fastening the drop-out member 10 for the stay frame 1 with the bolt 5. In addition, the stopper unit 30 supports both side edge parts in the front and rear direction on the open end of the assembly slot 20 inside the drop-out mounting unit 3 when the bolt 5 is loosened.

The stopper unit 30 includes a first stopper protrusion 31 and a second stopper protrusion 32. The first stopper protrusion 31 is formed to be protruded rearwardly at one side of the upper end part of the drop-out member 10. In addition, the second stopper protrusion 32 is formed to be protruded forwardly at the other side of the upper end part of the drop-out member 10 with the protrusion length P2 that is larger than the protrusion length P1 of the first stopper protrusion 31.

As shown in FIG. 1, the first stopper protrusion 31 is in surface contact with a rear end upper part that is rounded in the up and down direction of the drop-out mounting unit 3 at the inside of the drop-out mounting unit 3 (indicated by "A" in FIG. 1).

Hereinafter, in the drop-out mounting structure 100 of the bicycle frame according to the first exemplary form of the present disclosure, a mounting process and an operation effect of the drop-out member 10 for the stay frame 1 are described in detail with reference to FIGS. 1 and 2.

First, in the exemplary form of the present disclosure, the bicycle frame of which the assembly slot 20 is formed at the drop-out mounting unit 3 lower end of the stay frame 1 and the bolt coupling holes 7 are formed at the drop-out mounting unit 3 is provided.

In addition, the drop-out member 10 of which the bolt fastening holes 11 corresponding to the bolt coupling holes 7 of the drop-out mounting unit 3 are formed, the stopper unit 30 is formed at the upper end part, and the axle insertion groove 13 is formed at the lower part, is provided.

In this state, the drop-out member 10 is inserted inside the drop-out mounting unit 3 through the open end of the assembly slot 20 at the lower side of the assembly slot 20. After that, the drop-out member 10 is turned in one direction at the open end lower side of the assembly slot 20 and is obliquely inserted inside the drop-out mounting unit 3 through the open end thereof.

Next, the drop-out member 10 is turned in the other direction and is fixedly disposed inside the drop-out mounting unit 3. In this state, the bolts 5 are fastened to the bolt coupling holes 7 of the drop-out mounting unit 3 and the bolt fastening holes 11 of the drop-out member 10 for mounting the drop-out member 10 to the drop-out mounting unit 3.

The upper portion of the drop-out member 10 supports the upper end of the drop-out mounting unit 3 through the first stopper protrusion 31 and the second stopper protrusion 32 of the stopper unit 30 inside the drop-out mounting unit 3. In this case, the first stopper protrusion 31 is in surface contact with the rear end upper portion inside the drop-out mounting unit 3.

Accordingly, when the bolts 5 are all loosened by the external impact or vibration such that the drop-out member 10 is separated from the drop-out mounting unit 3, in the exemplary form of the present disclosure, the first stopper protrusion 31 and the second stopper protrusion 32 of the stopper unit 30 support both side edge parts in the front and rear direction of open end of the assembly slot 20 inside the drop-out mounting unit 3.

That is, in the exemplary form of the present disclosure, since the length W1 of the stopper unit 30 in the front and rear direction is longer than the length L1 of the opening end of the assembly slot 20, the first stopper protrusion 31 and the second stopper protrusion 32 of the stopper unit 30 are caught in the front and rear direction side edge parts of the open end of the assembly slot 20 inside the drop-out mounting unit 3.

Accordingly, the drop-out member 10 may be inhibited from being separated from the drop-out mounting unit 3 along with the rear wheel connection body by the loosening of the bolt 5. The user's injury by the separation of the drop-out member 10 from the stay frame 1 together with the rear wheel may be avoided.

Figure 3:
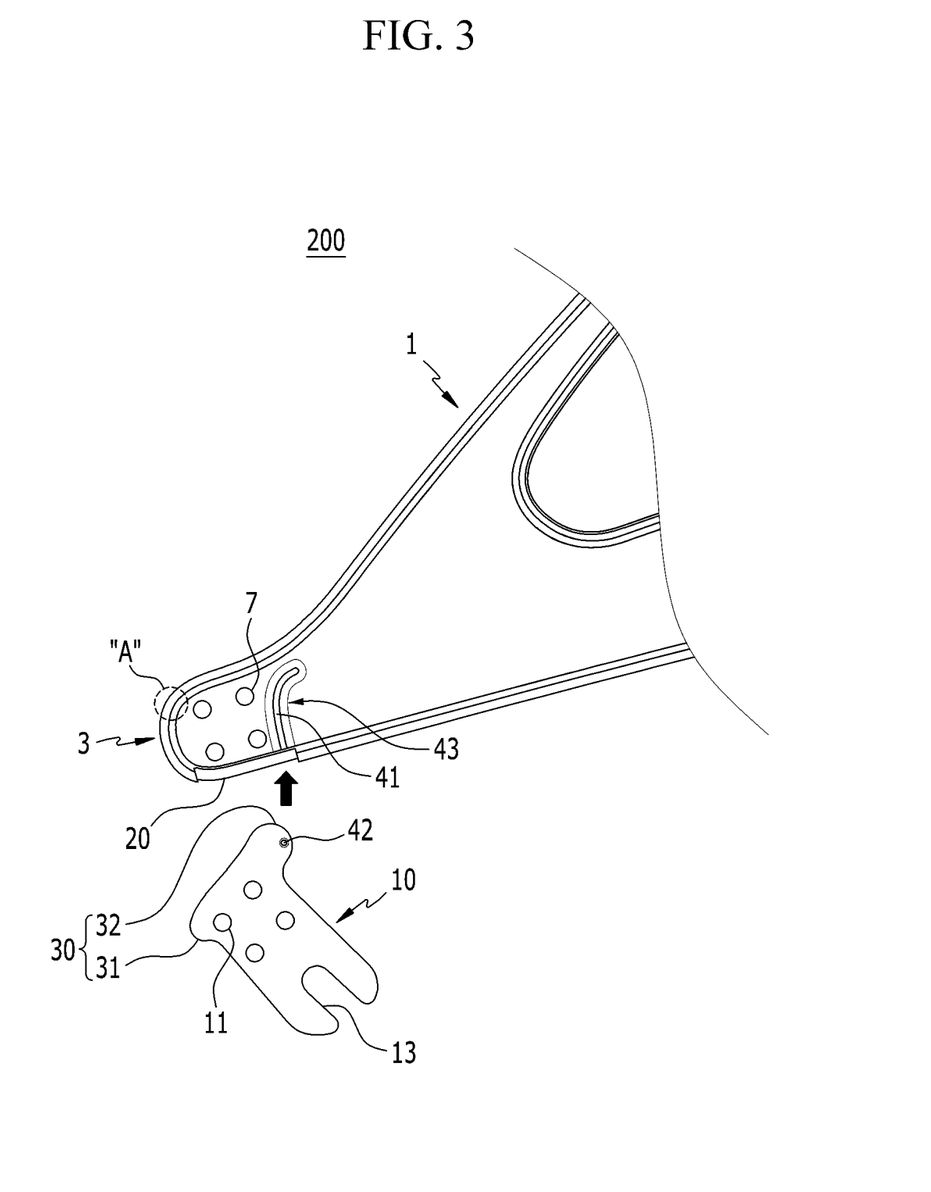
FIG. 3 is an exploded perspective view showing a drop-out mounting structure of a bicycle frame according to a second exemplary form of the present disclosure.
Figure 4:
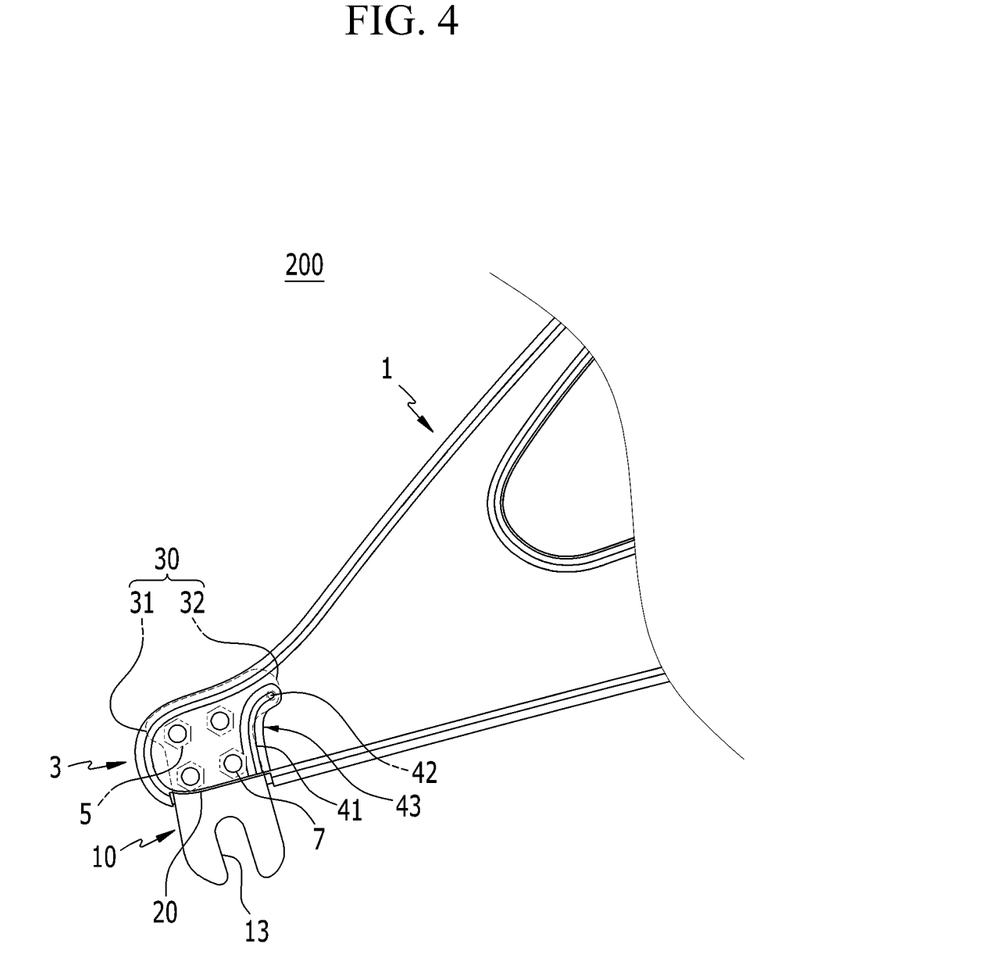
FIG. 4 is a coupled side schematic diagram showing the drop-out mounting structure of the bicycle frame according to the second exemplary form of the present disclosure.

FIG. 3 is an exploded perspective view showing a drop-out mounting structure of a bicycle frame according to a second exemplary form of the present disclosure, and FIG. 4 is a coupled side schematic diagram showing a drop-out mounting structure of a bicycle frame according to a second exemplary form of the present disclosure.

Referring to FIG. 3 and FIG. 4, the drop-out mounting structure 200 of the bicycle frame according to the second exemplary form of the present disclosure may include a guide unit capable of guiding the drop-out member 10 to be inserted inside the drop-out mounting unit 3 while basically having the structure of the first exemplary form.

In the second exemplary form of the present disclosure, the guide unit may include a guide groove 41 formed at the drop-out mounting unit 3, and a guide protrusion 42 formed at the drop-out member 10.

The guide groove 41 is formed at one side panel of the drop-out mounting unit 3 along the insertion path of the drop-out member 10 as described in the first exemplary form. In the second exemplary form of the present disclosure, the guide groove 41 extends in the upper side direction at the opening end of the assembly slot 20, and forms a guide path 43 that is bent toward the front side.

Further, the guide protrusion 42 is formed at the drop-out member 10 to be sliding-coupled to the guide groove 41 of the drop-out mounting unit 3, thereby being formed at the second stopper protrusion 32 of the stopper unit 30.

According to the second exemplary form of the present disclosure the drop-out member 10 may be inserted into the drop-out mounting unit 3 while sliding the guide protrusion 42 through the assembly slot 20 along the guide path 43 of the guide groove 41. Thus, the drop-out member 10 may more accurately and easily assemble to the drop-out mounting unit 3 through the guide unit.

The remaining configuration and operation effects of the drop-out mounting structure 200 of the bicycle frame according to the second exemplary form of the present disclosure are the same as those in the first exemplary form of the present disclosure, and detailed descriptions thereof will be omitted.

Figure 5:
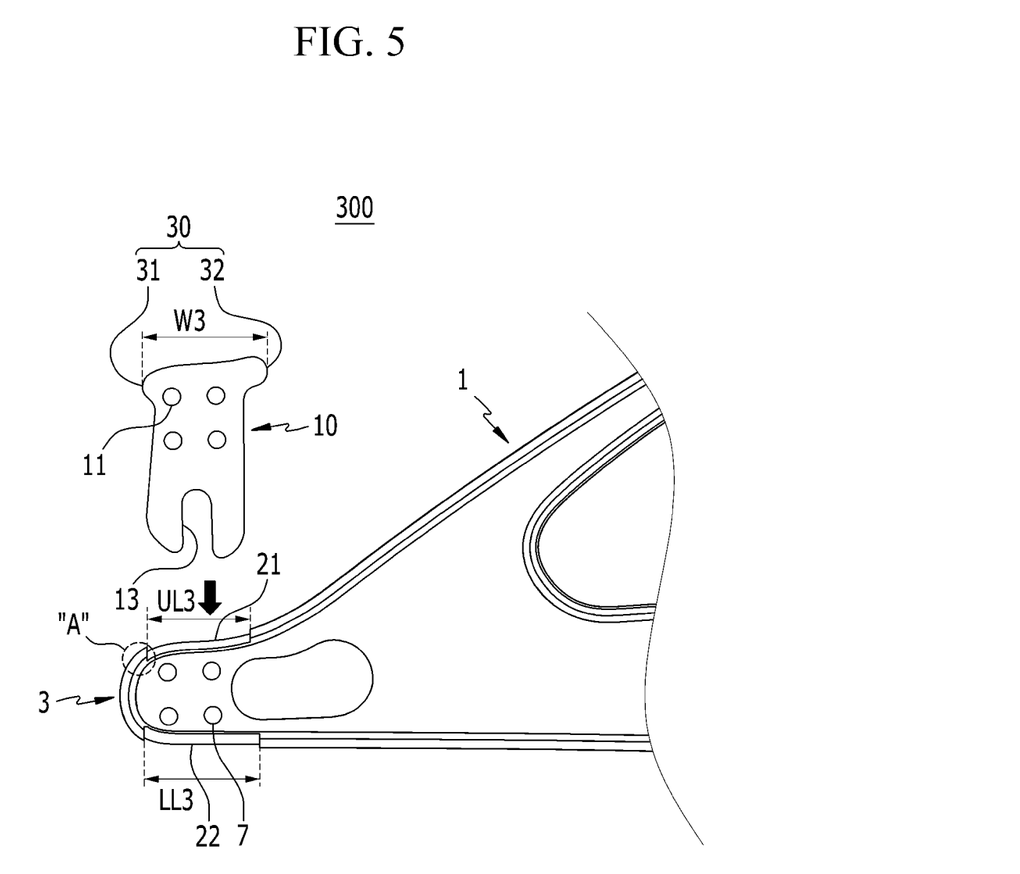
FIG. 5 is an exploded perspective view showing a drop-out mounting structure of a bicycle frame according to a third exemplary form of the present disclosure.
Figure 6:
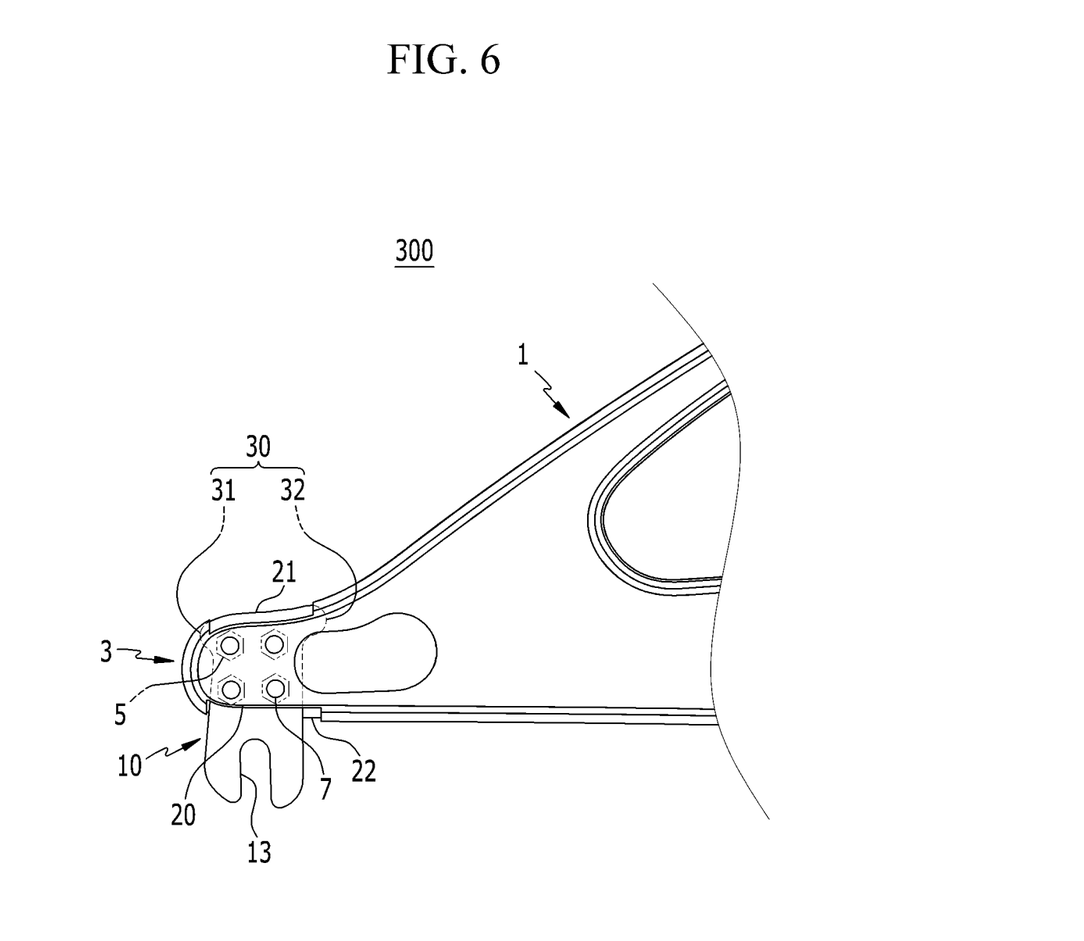
FIG. 6 is a coupled side schematic diagram showing the drop-out mounting structure of the bicycle frame according to the third exemplary form of the present disclosure.

FIG. 5 is an exploded perspective view showing a drop-out mounting structure of a bicycle frame according to a third exemplary form of the present disclosure, and FIG. 6 is a coupled side schematic diagram showing a drop-out mounting structure of a bicycle frame according to the third exemplary form of the present disclosure.

Referring to FIG. 5 and FIG. 6, the drop-out mounting structure 300 of the bicycle frame according to the third exemplary form of the present disclosure is made of a structure in which the drop-out member 10 may be mounted from the upper side to the lower side direction for the drop-out mounting unit 3 of the stay frame 1.

Since the drop-out member 10 includes the stopper unit 30 like that in the first exemplary form, a detailed description of the configuration will be omitted.

In the third exemplary form of the present disclosure, a first assembly slot 21 is formed at the upper end of the drop-out mounting unit 3 in the front and rear direction, and a second assembly slot 22 corresponding to the first assembly slot 21 is formed at the lower end of the drop-out mounting unit 3 in the front and rear direction.

The stopper unit 30 of the drop-out member 10 includes the first and second stopper protrusions 31 and 32 like in the first exemplary form. In addition, the stopper unit 30 with a length W3 that is longer than the length UL3 and LL3 of the opening end of the first and second assembly slots 21 and 22 is formed along the front and rear direction.

Furthermore, both ends of the stopper unit 30 support both side edge parts in the front and rear direction of the first assembly slot 21 inside the drop-out mounting unit 3. That is, inside the drop-out mounting unit 3, the first stopper protrusion 31 supports the edge part of the rear side of the first assembly slot 21, and the second stopper protrusion 32 supports the edge part of the front side of the first assembly slot 21.

As shown in FIG. 5, between the first and second assembly slots 21 and 22, the first stopper protrusion 31 is in surface contact with the rear upper part (indicated by "A" in FIG. 5) rounded in the up and down direction of the drop-out mounting unit 3.

According to the third exemplary form of the present disclosure, the mounting process of the drop-out member 10 for the stay frame 1 will be described in detail with reference to FIGS. 5 and 6.

First, in the third exemplary form of the present disclosure, the bicycle frame in which the first assembly slot 21 is formed at the upper end of the drop-out mounting unit 3 of the stay frame 1, the second assembly slot 22 corresponding to the first assembly slot 21 is formed at the lower end of the drop-out mounting unit 3, and the bolt coupling holes 7 are formed at the drop-out mounting unit 3 is provided.

In addition, the drop-out member 10 in which the bolt fastening holes 11 corresponding to the bolt coupling holes 7 of the drop-out mounting unit 3 are formed, the stopper unit 30 is formed at the upper end part, and the axle insertion groove 13 is formed at the lower part, is provided.

In this state, in the third exemplary form of the present disclosure, the drop-out member 10 is inserted inside the drop-out mounting unit 3 through the first and second assembly slots 21 and 22.

The drop-out member 10 is turned in one direction at the open end upper side of the first assembly slot 21, and is obliquely inserted inside the drop-out mounting unit 3 through the first assembly slot 21. After that, the drop-out member 10 is turned to the other side while moving in the rear side to be fixedly disposed inside the drop-out mounting unit 3.

In this case, the bolts 5 are fastened to the bolt coupling holes 7 of the drop-out mounting unit 3 and the bolt fastening holes 11 of the drop-out member 10, such that the drop-out member 10 is mounted on the drop-out mounting unit 3.

Accordingly, the upper part of the drop-out member 10 supports the upper end of the drop-out mounting unit 3 through the first stopper protrusion 31 and the second stopper protrusion 32 of the stopper unit 30 inside the drop-out mounting unit 3. In this case, the first stopper protrusion 31 supports the rear side edge part of the first assembly slot 21, and the second stopper protrusion 32 supports the front side edge part of the first assembly slot 21. In addition, the first stopper protrusion 31 is in surface contact with the rear upper part inside the drop-out mounting unit 3.

Accordingly, when all bolts 5 are released by the external impact or vibration such that the drop-out member 10 is separated from the drop-out mounting unit 3, in the exemplary form of the present disclosure, the first stopper protrusion 31 of the stopper unit 30 supports the rear side edge part of the second assembly slot 22, and the second stopper protrusion 32 supports the front side edge part of the second assembly slot 22.

Since the front and rear direction length W3 of the stopper unit 30 is longer than the opening end length UL3 and LL3 of the first and second assembly slots 21 and 22, the first stopper protrusion 31 and the second stopper protrusion 32 of the stopper unit 30 are caught at both side edges of the second assembly slot 22 open end in the front and rear direction inside the drop-out mounting unit 3.

Accordingly, the drop-out member 10 may be inhibited or prevented from being separated from the drop-out mounting unit 3 along with the rear wheel connection body by the loosening of the bolt 5.

The remaining configuration and operation effects of the drop-out mounting structure 300 of the bicycle frame according to the third exemplary form of the present disclosure as described above are the same as those in the previous exemplary forms of the present disclosure, and detailed descriptions thereof will be omitted.

Figure 7:
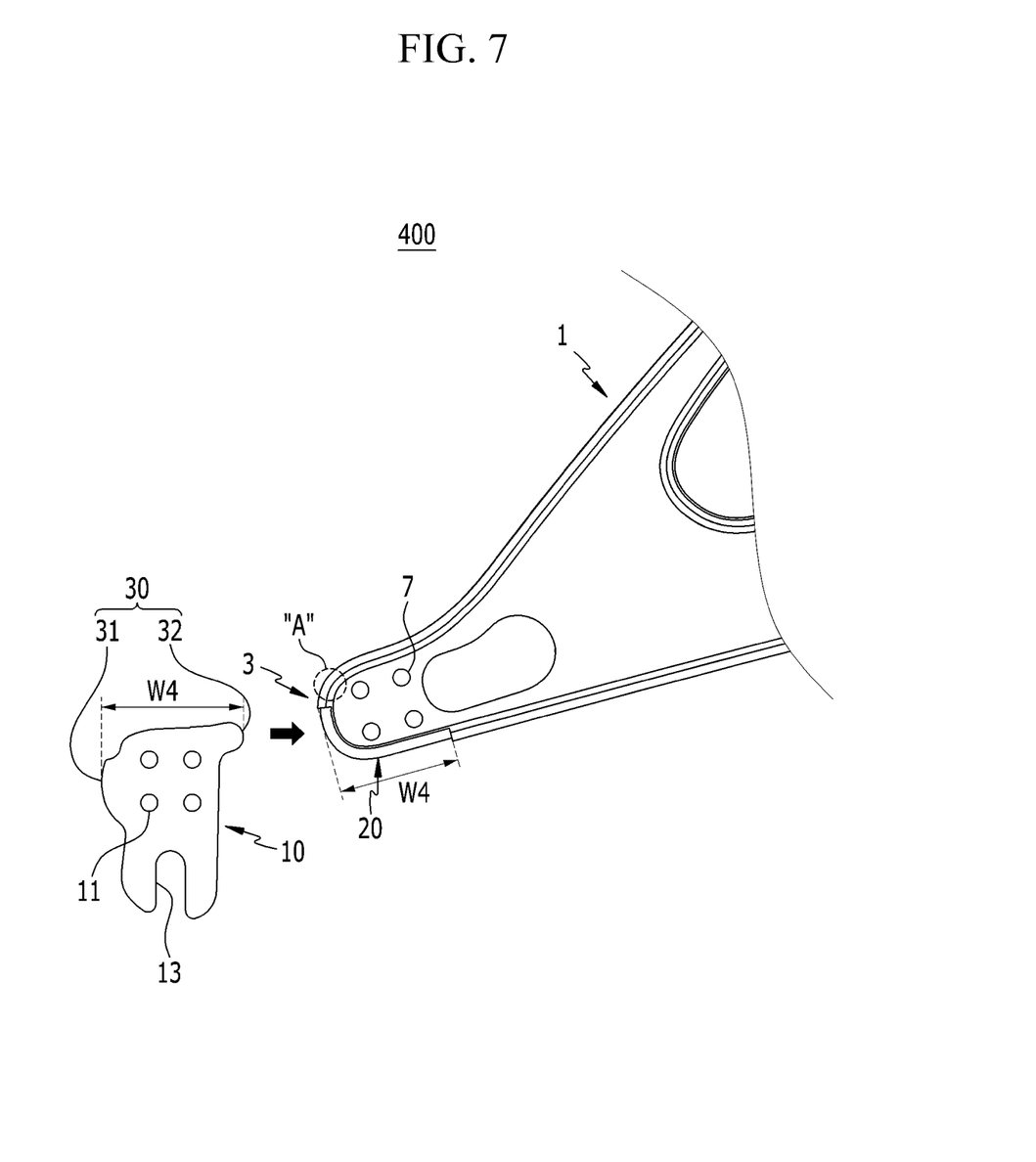
FIG. 7 is an exploded perspective view showing a drop-out mounting structure of a bicycle frame according to a fourth exemplary form of the present disclosure.
Figure 8:
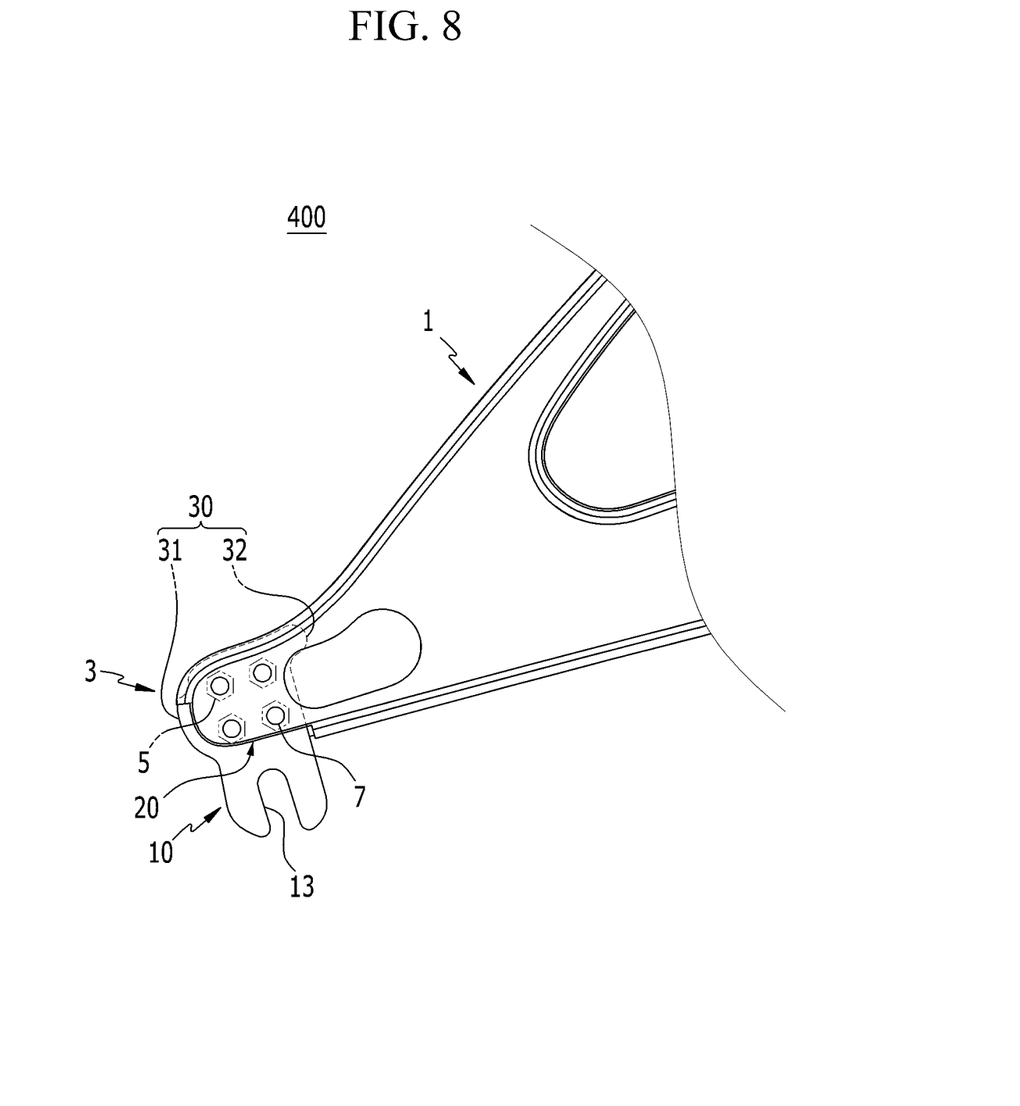
FIG. 8 is a coupled side schematic diagram showing the drop-out mounting structure of the bicycle frame according to the fourth exemplary form of the present disclosure.

FIG. 7 is an exploded perspective view showing a drop-out mounting structure of a bicycle frame according to a fourth exemplary form of the present disclosure, and FIG. 8 is a coupled side schematic diagram showing a drop-out mounting structure of a bicycle frame according to the fourth exemplary form of the present disclosure.

Referring to FIG. 7 and FIG. 8, the drop-out mounting structure 400 of the bicycle frame according to the fourth exemplary form of the present disclosure is made of a structure in which the drop-out member 10 may be mounted in the rear side for the drop-out mounting unit 3 of the stay frame 1.

In the exemplary form of the present disclosure, the assembly slot 20 is formed at the rear end and the lower end of the drop-out mounting unit 3. The assembly slot 20 is formed as one slot (the opening) at the rear end and the lower end of the drop-out mounting unit 3.

The stopper unit 30 is formed at the upper end part of the drop-out member 10, and the stopper unit 30 is formed with a width W4 that is larger than the width L4 in the front and rear direction of the assembly slot 20.

The stopper unit 30 includes the first stopper protrusion 31 and the second stopper protrusion 32. The first stopper protrusion 31 is protruded and formed to be rounded to the rear side along the lower direction from the upper end part side of the drop-out member 10. The second stopper protrusion 32 is protruded and formed from the upper end part side of the drop-out member 10 to the front side.

As shown in FIG. 7, the first stopper protrusion 31 is in surface contact with the rear upper part (indicated by "A" in FIG. 7) rounded in the up and down direction of the drop-out mounting unit 3 inside the drop-out mounting unit 3.

According to the fourth exemplary form of the present disclosure, the mounting process of the drop-out member 10 for the stay frame 1 will be described in detail with reference to FIGS. 7 and 8.

First, in the fourth exemplary form of the present disclosure, the bicycle frame in which the assembly slot 20 at the rear end and the lower end of the drop-out mounting unit 3 of the stay frame 1 is formed and the bolt coupling holes 7 are formed at the drop-out mounting unit 3 thereof is provided.

The drop-out member 10 in which the bolt fastening holes 11 corresponding to the bolt coupling holes 7 of the drop-out mounting unit 3 are formed, the stopper unit 30 is formed at the upper end part, and the axle insertion groove 13 is formed at the lower part is provided.

In this state, the drop-out member 10 is inserted inside the drop-out mounting unit 3 through the assembly slot 20 at the rear side of the drop-out mounting unit 3. The drop-out member 10 is turned in one direction at the open end rear side of the assembly slot 20 and is obliquely inserted inside the drop-out mounting unit 3 through the assembly slot 20. In addition, the drop-out member 10 is turned in the other direction and is fixedly disposed inside the drop-out mounting unit 3.

In this state, the bolts 5 are fastened to the bolt coupling holes 7 of the drop-out mounting unit 3 and the bolt fastening holes 11 of the drop-out member 10, and the drop-out member 10 is mounted to the drop-out mounting unit 3.

Accordingly, the upper part of the drop-out member 10 supports the upper end of the drop-out mounting unit 3 through the first stopper protrusion 31 and the second stopper protrusion 32 of the stopper unit 30 inside the drop-out mounting unit 3. In this case, the first stopper protrusion 31 is in surface contact with the rear end part of the drop-out mounting unit 3 with the rounded shape.

When the bolts 5 are all released by the external impact or vibration and then the drop-out member 10 is separated from the drop-out mounting unit 3, the drop-out member 10 is rotated along one side direction with respect to the first stopper protrusion 31 by the weight of the rear wheel connection body coupled to the drop-out member 10.

Accordingly, the first stopper protrusion 31 supports the rear end of the drop-out mounting unit 3, and the second stopper protrusion 32 supports the lower end edge part (the lower edge part of the assembly slot) of the drop-out mounting unit 3.

That is, in the fourth exemplary form of the present disclosure, since the front and rear direction width W4 of the stopper unit 30 is larger than the front and rear direction width L4 of the assembly slot 20, in this case, the first stopper protrusion 31 is caught by the rear end of the drop-out mounting unit 3, and the second stopper protrusion 32 is caught by the lower end edge part of the drop-out mounting unit 3.

Accordingly, the drop-out member 10 may be inhibited or prevented from being separated from the drop-out mounting unit 3 along with the rear wheel connection body by the loosening of the bolt 5.

The remaining configuration and operation effects of the drop-out mounting structure 400 of the bicycle frame according to the fourth exemplary form of the present disclosure as described above are the same as those in the previous exemplary forms of the present disclosure, and detailed descriptions thereof will be omitted.

While this present disclosure has been described in correction with what is presently considered to be practical exemplary forms, it is to be understood that the present disclosure is not limited to the disclosed forms, but, on the contrary, it is intended to cover various modifications and equivalent arrangements included with the spirit and scope of the present disclosure.

<Description of symbols>

| | |
|---|---|
| 1: stay frame | 3: drop-out mounting unit |
| 5: bolt | 7: bolt coupling holes |
| 10: drop-out member | 11: bolt fastening holes |
| 13: axle insertion groove | 20: assembly slot |
| 21: first assembly slot | 22: second assembly slot |
| 30: stopper unit | 31: first stopper protrusion |
| 32: second stopper protrusion | 41: guide groove |
| 42: guide protrusion | 43: guide path |

What is claimed is:

1. A drop-out mounting structure for mounting a drop-out member as a wheel mounting unit to a drop-out mounting unit of a bicycle frame with a bolt, the drop-out mounting structure comprising:

an assembly slot formed at the drop-out mounting unit to insert the drop-out member inside the drop-out mounting unit; and a stopper unit formed at an upper end part of the drop-out member with a length that is longer than an opening end of the assembly slot, wherein:
the assembly slot is formed at a lower end of the drop-out mounting unit in a front and rear direction;
the stopper unit is formed at the upper end part of the drop-out member in the front and rear direction; and
the drop-out member is inserted inside the drop-out mounting unit through the assembly slot by turning the drop-out member in a direction, supports an inner upper end of the drop-out mounting unit through the stopper unit, and is fastened to the drop-out mounting unit by the bolt in a fixedly disposed state, and wherein the stopper unit includes:
a first stopper protrusion formed to be protruded from the upper end part of the drop-out member to a rear side; and
a second stopper protrusion formed to be protruded from the upper end part of the drop-out member to a front side with a protrusion length that is larger than the first stopper protrusion.

2. The drop-out mounting structure of claim 1, wherein the stopper unit supports the inner upper end of the drop-out mounting unit and both side edge parts in a front and rear direction of the opening end of the assembly slot.

3. The drop-out mounting structure of claim 1, wherein a portion of the drop-out member forming the stopper unit is disposed inside the drop-out mounting unit, and a lower part of the drop-out member forms an axle insertion groove and is disposed outside the drop-out mounting unit.

4. The drop-out mounting structure of claim 1, wherein the drop-out member is mounted to a stay frame of the bicycle frame in which both side panels that are respectively stamp-molded are bonded by welding.

5. The drop-out mounting structure of claim 4, wherein a plurality of bolt coupling holes are formed at one side panel of the stay frame, and a plurality of bolt fastening holes coinciding with the bolt coupling holes are formed at the drop-out member.

6. The drop-out mounting structure of claim 1, wherein the first stopper protrusion is in surface contact with a rear upper part rounded in an up and down direction of the drop-out mounting unit.

7. The drop-out mounting structure of claim 1, wherein:
a guide groove is formed along an insertion path of the drop-out member at the drop-out mounting unit; and
a guide protrusion coupled to slide in the guide groove is formed at the drop-out member.

8. The drop-out mounting structure of claim 1, wherein:
a guide groove is formed along an insertion path of the drop-out member at the drop-out mounting unit; and
a guide protrusion coupled to slide in the guide groove is formed at the second stopper protrusion.

9. The drop-out mounting structure of claim 8, wherein the guide groove extends in an upper direction at the opening end of the assembly slot and forms a guide path that is bent in the front side.

10. A drop-out mounting structure for mounting a drop-out member as a wheel mounting unit to a drop-out mounting unit of a bicycle frame in which both side panels that are respectively stamp-molded are bonded by welding with a bolt, the drop-out mounting structure comprising:

an assembly slot formed to be connected to a rear end and a lower end of the drop-out mounting unit to insert the drop-out member inside the drop-out mounting unit; and a stopper unit formed at an upper end part of the drop-out member with a width that is larger than a width of the assembly slot in a front and rear direction, wherein the drop-out member is inserted inside the drop-out mounting unit through the assembly slot by turning the drop-out member in a direction, supports an inner upper end of the drop-out mounting unit through the stopper unit, and is fastened to the drop-out mounting unit by the bolt in a fixedly disposed state, wherein
the stopper unit includes:
a first stopper protrusion formed to be protruded to a rear side and rounded along a lower direction at the upper end part of the drop-out member; and
a second stopper protrusion formed to be protruded to a front side from the upper end part of the drop-out member.

11. The drop-out mounting structure of claim 10, wherein, inside the drop-out mounting unit,
the first stopper protrusion is in surface contact with a rear upper part that is rounded in an up and down direction of the drop-out mounting unit.

* * * * *